(12) United States Patent
Kuriyama et al.

(10) Patent No.: US 11,489,557 B2
(45) Date of Patent: *Nov. 1, 2022

(54) WIRELESS COMMUNICATION SYSTEM, WIRELESS COMMUNICATION METHOD, TRANSMITTING STATION DEVICE AND RECEIVING STATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/433,443

(22) PCT Filed: Feb. 19, 2020

(86) PCT No.: PCT/JP2020/006547
§ 371 (c)(1),
(2) Date: Aug. 24, 2021

(87) PCT Pub. No.: WO2020/175279
PCT Pub. Date: Sep. 3, 2020

(65) Prior Publication Data
US 2022/0149898 A1  May 12, 2022

(30) Foreign Application Priority Data
Feb. 26, 2019 (JP) .............................. JP2019-033361

(51) Int. Cl.
*H04B 7/005* (2006.01)
*H04B 1/04* (2006.01)
(Continued)

(52) U.S. Cl.
CPC ............... *H04B 7/005* (2013.01); *H04B 1/04* (2013.01); *H04B 7/0417* (2013.01); *H04L 27/01* (2013.01)

(58) Field of Classification Search
CPC ... H04B 1/04; H04B 1/10; H04B 7/00; H04B 7/04; H04B 7/06; H04B 7/005;
(Continued)

(56) References Cited

U.S. PATENT DOCUMENTS 10,785,071 B2 * 9/2020 Nakajima ........... H04L 27/2607
2005/0107057 A1 5/2005 Sun
(Continued)

FOREIGN PATENT DOCUMENTS

| JP | 2007508721 A | 4/2007 |
| WO | WO-2014115374 A1 | 7/2014 |
| WO | WO-2018073851 A1 | 4/2018 |

OTHER PUBLICATIONS

Keita Kuriyama et al., FIR-type Transmit Beamforming for Wideband Single Carrier MIMO Transmission, IEICE Technical Report, vol. 118, No. 435, 2019, pp. 31-36.
(Continued)

*Primary Examiner* — Shawkat M Ali

(57) ABSTRACT

In the present invention, a transmitting station apparatus includes a training signal generation unit, a transmission end linear equalization unit configured to output a plurality of second data signals obtained by equalizing IAI of a plurality of first data signals by using a transmission end transfer function for equalizing IAI, and a transmitting station communication unit configured to transmit a training signal or (Continued)

the plurality of second data signals to a receiving station apparatus and receive information on the transmission end transfer function from the receiving station apparatus, and the receiving station apparatus includes a communication path estimation unit configured to estimate a communication path response from the training signal received by the receiving station communication unit, a reception end coefficient calculation unit configured to calculate the transmission end transfer function and a reception end transfer function for equalizing ISI, based on the communication path response, and a reception end linear equalization unit configured to output a plurality of third data signals obtained by equalizing ISI from the plurality of second data signals received by the receiving station communication unit by using the reception end transfer function.

6 Claims, 6 Drawing Sheets

(51) Int. Cl.
*H04B 7/0417* (2017.01)
*H04L 27/01* (2006.01)

(58) Field of Classification Search
CPC .... H04B 7/216; H04B 7/0417; H04B 7/0452; H04B 7/0617; H04B 15/00; H04B 17/00; H04B 7/345; H04L 1/00; H04L 5/00; H04L 25/02; H04L 25/03; H04L 27/00; H04L 27/01; H04L 27/26; H04W 24/00; H04W 72/04; H04W 72/08; H04W 72/0413
USPC .......... 370/252, 329, 342, 344; 375/219, 375/230–231, 259, 267, 295, 316; 455/63.1, 67.11, 272, 509
See application file for complete search history.

(56) References Cited

U.S. PATENT DOCUMENTS

| | | |
|---|---|---|
| 2015/0358103 A1 | 12/2015 | Ohwatari et al. |
| 2019/0222246 A1 | 7/2019 | Takahashi et al. |
| 2020/0099428 A1* | 3/2020 | Ciochina ................ H04B 17/12 |
| 2022/0140866 A1* | 5/2022 | Kuriyama ............. H04B 7/005 375/231 |

OTHER PUBLICATIONS

Tomoaki Takeuchi and Kazuhiko Shibuya, Channel Equalizer for SDM MIMO-OFDM Systems with Insufficient Guard Interval, IEICE Technical Report, vol. 113, No. 301, 2013, pp. 37-42.

* cited by examiner

WIRELESS COMMUNICATION SYSTEM, WIRELESS COMMUNICATION METHOD, TRANSMITTING STATION DEVICE AND RECEIVING STATION DEVICE

CROSS-REFERENCE TO RELATED APPLICATIONS

This application is a 371 U.S. National Phase of International Application No. PCT/JP2020/006547 filed on Feb. 19, 2020, which claims priority to Japanese Application No. 2019-033361 filed on Feb. 26, 2019. The entire disclosures of the above applications are incorporated herein by reference.

TECHNICAL FIELD

The present invention relates to a technology of a time domain linear equalization unit for suppressing inter-antenna interference and inter-symbol interference in a wireless communication system that performs single carrier multiple-input multiple-output (SC-MIMO) transmission.

BACKGROUND ART

Broadband SC-MIMO transmission in a communication environment where frequency-selective fading occurs requires processing of suppressing inter-antenna interference (IAI) caused by a spatial extent of a plurality of antennas and inter-symbol interference (ISI) caused by a temporal extent of communication path characteristics.

Thus, a method for simultaneously equalizing the IAI/ISI with low processing delay has been studied by performing transmission beam formation in the time/spatial direction by using a time domain linear equalization unit (for example, see NPL 1).

CITATION LIST

Non Patent Literature

NPL 1: Keita Kuriyama, Hayato Fukuzono, Masafumi Yoshioka, Tsutomu Tatsuta, "FIR-type Transmit Beamforming for Wide-band Single Carrier MIMO Transmission" IEICE Technical Report, vol. 118, no. 435, RCS2018-247, pp. 31-36, January, 2019.

SUMMARY OF THE INVENTION

Technical Problem

However, in NPL 1, a polynomial multiplication is performed to calculate the transfer function matrix of the equalization unit, and thus there is a problem that, when the length of the channel impulse response (CIR) is large, the degree of the polynomial increases, and the computation amount becomes large. Because the transfer function of the equalization unit is an infinite impulse response (IIR) type, there is a problem that IAI/ISI components remain due to the error due to tap truncation.

An object of the present invention is to provide a wireless communication system, a wireless communication method, a transmitting station apparatus, and a receiving station apparatus capable of reducing the computation amount of an equalization unit that equalizes the IAI and ISI in the SC-MIMO transmission, and suppressing the residual errors due to tap truncation.

Means for Solving the Problem

A first invention is a wireless communication system configured to perform SC-MIMO transmission between a transmitting station apparatus and a receiving station apparatus, in which the transmitting station apparatus includes a training signal generation unit configured to generate a training signal that is known, a transmission end linear equalization unit configured to output a plurality of second data signals obtained by equalizing inter-antenna interference of a plurality of first data signals by using a transmission end transfer function for equalizing inter-antenna interference, and a transmitting station communication unit including a plurality of antennas configured to transmit the training signal or the plurality of second data signals to the receiving station apparatus and receive information on the transmission end transfer function from the receiving station apparatus, and the receiving station apparatus includes a receiving station communication unit including a plurality of antennas configured to receive the plurality of second data signals or the training signal transmitted by the transmitting station apparatus and transmit the information on the transmission end transfer function to the transmitting station apparatus, a communication path estimation unit configured to estimate a communication path response from the training signal received by the receiving station communication unit, a reception end coefficient calculation unit configured to calculate the transmission end transfer function for equalizing inter-antenna interference and a reception end transfer function for equalizing inter-symbol interference, based on the communication path response, and a reception end linear equalization unit configured to output a plurality of third data signals obtained by equalizing inter-symbol interference from the plurality of second data signals received by the receiving station communication unit by using the reception end transfer function.

In a second invention, in the first invention, the reception end coefficient calculation unit calculates only the reception end transfer function used by the reception end linear equalization unit, and transmits information on the communication path response to the transmitting station apparatus, and the transmitting station apparatus further includes a transmission end coefficient calculation unit configured to calculate, based on the information on the communication path response received from the receiving station apparatus, the transmission end transfer function for equalizing inter-antenna interference.

A third invention is a wireless communication method for performing SC-MIMO transmission between a transmitting station apparatus and a receiving station apparatus, the wireless communication method including the steps of, by the transmitting station apparatus, generating a training signal that is known, by the transmitting station apparatus, outputting a plurality of second data signals obtained by equalizing inter-antenna interference of a plurality of first data signals by using a transmission end transfer function for equalizing inter-antenna interference, by the transmitting station apparatus, transmitting the training signal or the plurality of second data signals to the receiving station apparatus and receiving information on the transmission end transfer function from the receiving station apparatus, by the receiving station apparatus, receiving the plurality of second data signals or the training signal transmitted by the transmitting station apparatus and transmitting the information on the transmission end transfer function to the transmitting station apparatus, by the receiving station apparatus, estimating a communication path response from the training signal received from the transmitting station apparatus, by the receiving station apparatus, calculating the transmission end transfer function for equalizing inter-antenna interference and a reception end transfer function for equalizing inter-symbol interference, based on the communication path response, and, by the receiving station apparatus, outputting a plurality of third data signals obtained by equalizing inter-symbol interference from the plurality of second data signals that are received by using the reception end transfer function.

In a fourth invention, in relation to the third invention, the calculating step by the receiving station apparatus calculates only the reception end transfer function used by the outputting step by the receiving station apparatus, and transmits information on the communication path response to the transmitting station apparatus, and the transmitting station apparatus further performs calculating, based on the information on the communication path response received from the receiving station apparatus, the transmission end transfer function for equalizing inter-antenna interference.

A fifth invention is a transmitting station apparatus configured to perform SC-MIMO transmission with a receiving station apparatus, the transmitting station apparatus including a training signal generation unit configured to generate a training signal that is known, a transmission end linear equalization unit configured to output a plurality of second data signals obtained by equalizing inter-antenna interference of a plurality of first data signals by using a transmission end transfer function for equalizing inter-antenna interference, and a transmitting station communication unit including a plurality of antennas configured to transmit the training signal or the plurality of second data signals to the receiving station apparatus and receive information on the transmission end transfer function from the receiving station apparatus.

In a sixth invention, in relation to the fifth invention, the transmitting station apparatus further includes a transmission end coefficient calculation unit configured to calculate, based on information on a communication path response received from the receiving station apparatus, the transmission end transfer function for equalizing inter-antenna interference.

A seventh invention is a receiving station apparatus configured to perform SC-MIMO transmission with a transmitting station apparatus, the receiving station apparatus including a receiving station communication unit including a plurality of antennas configured to receive a plurality of second data signals or a training signal transmitted by the transmitting station apparatus and transmit information on a transmission end transfer function for equalizing inter-antenna interference on a transmission end to the transmitting station apparatus, a communication path estimation unit configured to estimate a communication path response from the training signal received by the receiving station communication unit, a reception end coefficient calculation unit configured to calculate the transmission end transfer function for equalizing inter-antenna interference and a reception end transfer function for equalizing inter-symbol interference, based on the communication path response, and a reception end linear equalization unit configured to output a plurality of third data signals obtained by equalizing inter-symbol interference from the plurality of second data signals received by the receiving station communication unit by using the reception end transfer function.

In an eighth invention, in relation to the seventh invention, the reception end coefficient calculation unit calculates only the reception end transfer function used by the reception end linear equalization unit, and transmits information on the communication path response to the transmitting station apparatus.

Effects of the Invention

The wireless communication system, the wireless communication method, the transmitting station apparatus, and the receiving station apparatus according to the present invention can reduce the computation amount of the equalization unit that equalizes the IAI and ISI in the SC-MIMO transmission, and suppress the residual errors due to tap truncation.

DESCRIPTION OF EMBODIMENTS

Hereinafter, embodiments of a wireless communication system, a wireless communication method, a transmitting station apparatus, and a receiving station apparatus according to the present invention will be described with reference to the drawings.

Figure 1:
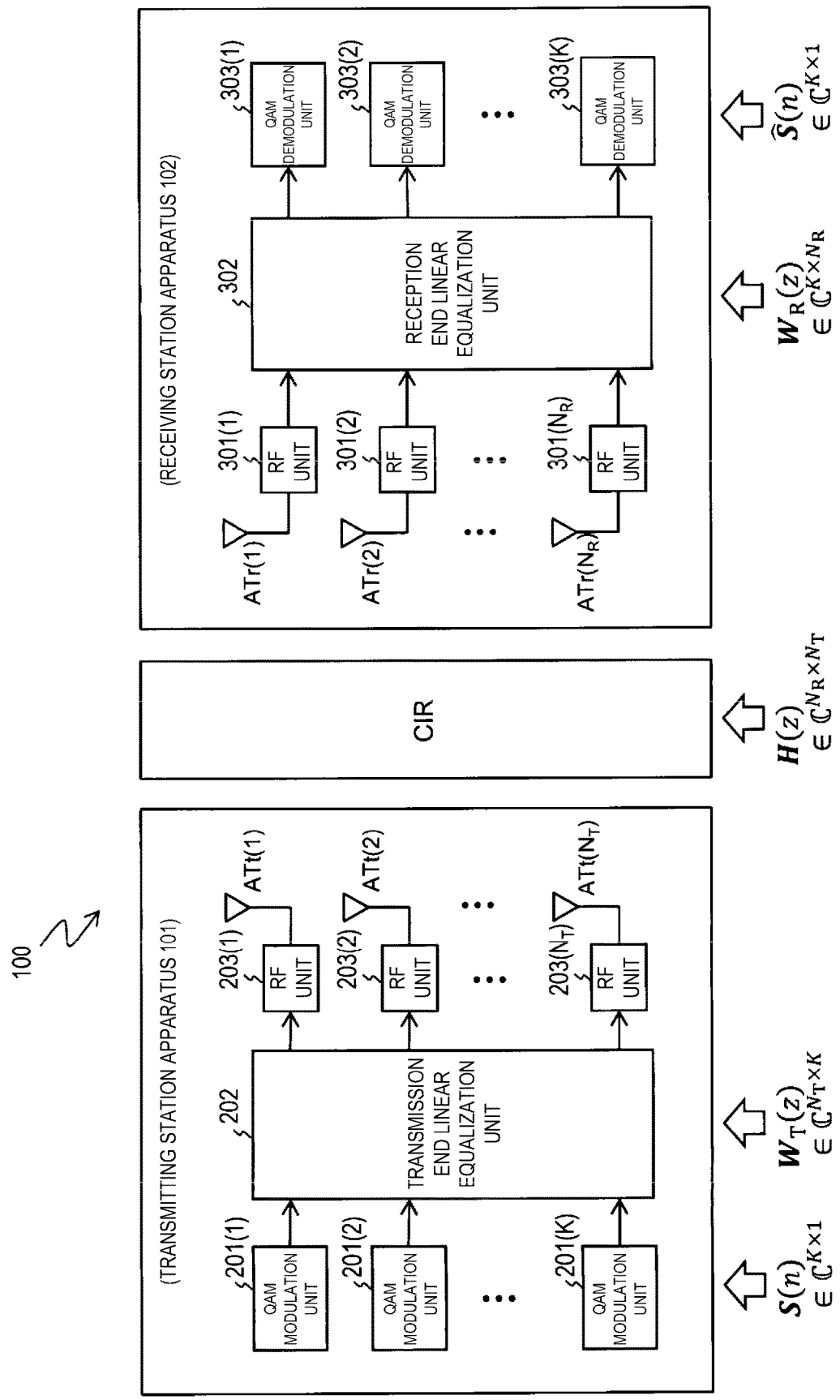
FIG. 1 is a diagram illustrating an example of a wireless communication system according to a first embodiment and a second embodiment.

FIG. 1 illustrates an example of a wireless communication system 100 according to a first embodiment and a second embodiment. In FIG. 1, the wireless communication system 100 includes a transmitting station apparatus 101 including a plurality of ($N_T$: $N_T$ is an integer of two or more ($N_T \geq 2$)) antennas from an antenna ATt (1) to an antenna ATt ($N_T$) and a receiving station apparatus 102 including a plurality of ($N_R$: $N_R$ is an integer of two or more ($N_R \geq 2$)) antennas from an antenna ATr (1) to an antenna ATr ($N_R$), and performs wireless communication between the transmitting station apparatus 101 and the receiving station apparatus 102. Here, in the following description, the antenna ATt (1) to the antenna ATt ($N_T$) of the transmitting station apparatus 101 each are referred to as "antenna ATt" with the numeral in parentheses at the end of the symbol being omitted when a common description among these antennas is given. In contrast, when a specific antenna is described, the antenna is referred to as, for example, "antenna ATt (1)" with the numeral in parentheses added to the end of the symbol. This similarly applies to the antenna ATr (1) to the antenna ATr ($N_R$) of the receiving station apparatus 102. This similarly applies also to a case where a plurality of identical blocks are provided.

The wireless communication system 100 according to the present embodiment performs a wireless communication of broadband single carrier multiple-input multiple-output (SC-MIMO) scheme using a plurality of antennas between the transmitting station apparatus 101 and the receiving station apparatus 102. Here, a plurality of delay waves with different delay times, as in multipath propagation, are present in the wireless communication path between the transmitting station apparatus 101 and the receiving station apparatus 102, causing frequency-selective fading. For this reason, inter-symbol interference (ISI) caused by communication path characteristics and inter-antenna interference (IAI) need to be suppressed. In the example of FIG. 1, inter-antenna interference (IAI) due to spatial extent occurs between the $N_T$ antennas in the transmitting station apparatus 101 and the $N_R$ antennas in the receiving station apparatus 102. Signals transmitted and received between the antennas of the transmitting station apparatus 101 and the antennas of the receiving station apparatus 102 are affected by inter-symbol interference (ISI) caused by temporal extent. Here, when a communication path response (CIR) of the wireless communication path between the transmitting station apparatus 101 and the receiving station apparatus 102 is H(z), the communication path response H(z) can be represented by a matrix of a transfer function (referred to as a transfer function matrix) that uses $N_T*N_R$ as an element in accordance with the number of the plurality of antennas.

In FIG. 1, the transmitting station apparatus 101 includes quadrature amplitude modulation (QAM) modulation units 201, a transmission end linear equalization unit 202, RF units 203, and antennas ATt.

The QAM modulation units 201 output a data signal S(n) (referred to as a transmission data signal) obtained by performing quadrature amplitude modulation (QAM) on a bit sequence of data information bits to be transmitted to the receiving station apparatus 102. Note that the QAM modulation units 201 include a QAM modulation unit 201 (1) to a QAM modulation unit 201 (K) (K: K is an integer equal to or greater than 1 (K≥1)), and output a data signal S(n) corresponding to K streams. Here, the data signal S(n) is a matrix with K*1 as an element.

The transmission end linear equalization unit 202 performs equalization processing by a transfer function matrix $W_T(z)$ on the transmission end calculated on the basis of the CIR between the transmitting station apparatus 101 and the receiving station apparatus 102. The transfer function matrix $W_T(z)$ is a matrix with $N_T*K$ transfer functions as elements. Note that the processing for normalizing a transmission power is also performed at the same time as the equalization processing. Here, in the present embodiment, the transmission end linear equalization unit 202 equalizes IAI by transmission beam forming. The transmission end linear equalization unit 202 can be implemented by an equalization unit of a finite impulse response (FIR) type that has a delay tap holding the data signal output by the QAM modulation unit 201, for example, and shifting the data signal every fixed time, and outputs a sum of signals obtained by multiplying respective delay tap signals by predetermined tap coefficients. Here, the transfer function for the IAI equalization is calculated on the basis of the CIR estimated by the receiving station apparatus 102 by a training signal transmitted from the transmitting station apparatus 101.

The RF units 203 include $N_T$ RF units of an RF unit 203 (1) to an RF unit 203 ($N_T$) corresponding to the respective $N_T$ antennas ATt, and frequency-convert the data signals obtained by equalizing IAI or the training signal output by the transmission end linear equalization unit 202 to high-frequency transmission signals, and transmit the result from the antennas ATt for respective streams.

The antennas ATt include the $N_T$ transmission and reception antennas of the antenna ATt (1) to the antenna ATt ($N_T$) and emit high-frequency signals output by the RF units 203 as electromagnetic waves to the space.

In this manner, the transmitting station apparatus 101 can transmit transmission signals obtained by equalizing IAI to the receiving station apparatus 102.

In FIG. 1, the receiving station apparatus 102 includes antennas ATr, RF units 301, a reception end linear equalization unit 302, and QAM demodulation units 303.

The antennas ATr include $N_R$ transmission and reception antennas of an antenna ATr (1) to an antenna ATr ($N_R$), and convert electromagnetic waves in the space transmitted from the transmitting station apparatus 101 into high-frequency signals.

The RF units 301 include $N_R$ RF units of an RF unit 301 (1) to an RF unit 301 ($N_R$) corresponding to the respective $N_R$ antennas ATr, and frequency-convert high-frequency signals output by the antenna ATr (1) to the antenna ATr ($N_R$) to baseband signals.

The reception end linear equalization unit 302 performs equalization processing by a transfer function matrix $W_R(z)$ on the reception end calculated on the basis of the CIR between the transmitting station apparatus 101 and the receiving station apparatus 102. The transfer function matrix $W_R(z)$ is a matrix with $K*N_R$ transfer functions as elements. Here, the transfer function matrix $W_R(z)$ is calculated on the basis of the CIR estimated by the receiving station apparatus 102 by a training signal transmitted from the transmitting station apparatus 101, and equalizes the ISI.

The QAM demodulation units 303 demodulate data signals S^(n) of K streams obtained by equalizing the ISI output by the reception end linear equalization unit 302 to information bits, and output a bit sequence. Note that because the reception end linear equalization unit 302 outputs data signals S^(n) of $N_R$ streams according to the number of antennas ATr, the QAM demodulation units 303 demodulate the data signals S^(n) for respective streams.

In this manner, the receiving station apparatus 102 may equalize the ISI from the signals received at the $N_R$ antennas ATr and demodulate the data signals.

Note that the receiving station apparatus 102 estimates the CIR from the training signal transmitted from the transmitting station apparatus 101, and the receiving station apparatus 102 calculates the transfer function for the ISI equalization. As described below, the transfer function used by the transmission end linear equalization unit 202 may be calculated on the receiving station apparatus 102 end and transmitted to the transmitting station apparatus 101 end, or the CIR information may be transmitted from the receiving station apparatus 102 end to the transmitting station apparatus 101 end to calculate the transfer function on the transmitting station apparatus 101 end.

In FIG. 1, when the data signal output by the QAM modulation units 201 is denoted by S(n), the transfer function matrix of the transmission end linear equalization unit 202 is denoted by $W_T(Z)$, the transfer function matrix of the CIR is denoted by H(z), the transfer function matrix of the reception end linear equalization unit 302 is denoted by $W_R(z)$, the data signal output by the QAM demodulation units 303 is S^(n), and the added noise is denoted by η(n), the relationship between the signals transmitted and received in the wireless communication system 100 according to the present embodiment can be expressed by Equation (1).

[Math. 1]

$$\hat{S}(n) = W_R(z)\{H(z)W_T(z)S(n) + \eta(n)\} \qquad (1)$$
$$= W_R(z)H(z)W_T(z)S(n) + W_R(z)\eta(n)$$

Here, S(n), $W_T(z)$, H(z), $W_R(z)$, S^(n), and η(n) are as follows.

$S(n) \in \mathbb{C}^{K \times 1}$ $W_T(z) \in \mathbb{C}^{N_T \times K}$ $H(z) \in \mathbb{C}^{N_R \times N_T}$ $W_R(z) \in \mathbb{C}^{K \times N_R}$ $\hat{S}(n) \in \mathbb{C}^{K \times 1}$ $\eta(n) \in \mathbb{C}^{N_R \times 1}$ [Math. 2]

Note that C represents a set of elements of the matrix, for example, $C^{K+1}$ has (K+1) elements. Here, K is the number of streams of the data signals (where, $K=N_T$).

In Equation (1), the transfer function matrix H(z) of the CIR is expressed by Equation (2).

[Math. 3]

$$H(z) = \begin{bmatrix} H_{11}(z) & \cdots & H_{1N_T}(z) \\ \vdots & \ddots & \vdots \\ H_{N_R1}(z) & \cdots & H_{N_RN_T}(z) \end{bmatrix} \qquad (2)$$

Here, the transfer function $H_{n_rn_t}(z)$ for each element of the transfer function matrix H(z) is represented by Equation (3). Note that $n_r$ is an integer of $1 \le n_r \le N_R$ and $n_t$ is an integer of $1 \le n_t \le N_T$. Subscripts $n_r$ and $n_t$ of the symbols H and h in Equation (3), in the description of this document, are denoted as nr and nt as in $H_{nrnt}(z)$. This similarly applies to subscripts for other symbols.

[Math. 4]

$$H_{n_rn_t}(z) = \sum_{l=0}^{L-1} h^{(l)}_{n_rn_t} z^{-l} \qquad (3)$$

Here, $Z^{-1}$ is a delay element of the transfer function, $h^{(l)}_{nrnt}$ is the CIR for a l-th path between the $n_r$-th reception antenna and the $n_t$-th transmission antenna. l is an integer of $0 \le l \le L-1$ (L is a positive integer) and indicates a path number in the number of paths L. Note that the number of paths L indicates the number of multipaths or the like.

The transfer function matrix $W_T(z)$ of the transmission end linear equalization unit 202 of the transmitting station apparatus 101 is represented by Equation (4).

[Math. 5]

$$W_T(z) = \begin{bmatrix} W_{T,11}(z) & \cdots & W_{T,1K}(z) \\ \vdots & \ddots & \vdots \\ W_{T,N_T1}(z) & \cdots & W_{T,N_TK}(z) \end{bmatrix} \qquad (4)$$

Here, the transfer function $W_{T,n_tk}(z)$ for each element of the transfer function matrix $W_T(z)$ is represented by Equation (5). Note that $W^{(p)}_{T,n_tk}$ indicates the p-th tap coefficient of the transmission end linear equalization unit 202 that receives the data signal for the k-th stream (k is an integer of $1 \le k \le K$) and outputs a signal to the $n_t$-th transmission antenna. p is an integer of $0 \le p \le P-1$ (P is a positive integer), and indicates a tap number in the number of taps P of the transmission end linear equalization unit 202.

[Math. 6]

$$W_{T,n_tk}(z) = \sum_{p=0}^{P-1} w^{(p)}_{T,n_tk} z^{-p} \qquad (5)$$

The transfer function matrix $W_R(z)$ of the reception end linear equalization unit 302 of the receiving station apparatus 102 is represented by Equation (6).

[Math. 7]

$$W_R(z) = \begin{bmatrix} W_{R,1}(z) & \cdots & 0 \\ \vdots & \ddots & \vdots \\ 0 & \cdots & W_{R,N_R}(z) \end{bmatrix} \qquad (6)$$

Here, the transfer function $W_{R,n_r}(z)$ for each element of the transfer function matrix $W_R(z)$ is represented by Equation (7). Note that $W^{(q)}_{R,n_r}$ indicates the q-th tap coefficient of the reception end linear equalization unit 302 that receives the signal of the $n_r$-th reception antenna and performs the equalization processing. q is an integer of $0 \le q \le Q-1$ (Q is a positive integer), and indicates a tap number in the number of taps Q of the reception end linear equalization unit 302.

[Math. 8]

$$W_{R,n_r}(z) = \sum_{q=0}^{Q-1} w^{(q)}_{R,n_r} z^{-q} \qquad (7)$$

Calculation of Transfer Functions of Transmission End Linear Equalization Unit 202 and Reception End Linear Equalization Unit 302

Next, the calculation of the transfer function of the transmission end linear equalization unit 202 and the reception end linear equalization unit 302 in the zero-forcing reference will be described.

In the present embodiment, because the equalization of the CIR (H(z)) is performed separately by the transmitting station apparatus 101 and the receiving station apparatus 102, as shown in Equation (8), a matrix obtained by multiplying the transfer function matrix $W_T(z)$ of the transmission end linear equalization unit 202 and the transfer function matrix $W_R(z)$ of the reception end linear equalization unit 302 is the inverse matrix $H^{-1}(z)$ of the transfer function matrix H(z) of the CIR. Here, $H^{-1}(z)$ can be expressed in terms of a product of a transfer function of 1/det (H(z)) and a matrix of adj (H(z)).

[Math. 9]

$$W_R(z)W_T(z) = H^{-1}(z) = \frac{1}{\det(H(z))} adj(H(z)) \quad (8)$$

Here, det(•) and adj(•) represent a determinant and an adjugate matrix, respectively. Note that adj is different from an adjoint matrix that represents an Hermitian transpose.

In Equation (8), the transfer function matrix $W_T(z)$ of the transmission end linear equalization unit 202 is defined as Equation (9).

[Math. 10]

$$W_T(z) = adj(H(z)) \in \mathbb{C}^{N_T \times K} \quad (9)$$

Also, in Equation (8), the transfer function matrix $W_R(z)$ of the reception end linear equalization unit 302 is defined as Equation (10).

[Math. 11]

$$W_R(z) = \frac{1}{\det(H(z))} I \quad \in \mathbb{C}^{K \times N_R} \quad (10)$$

Here, I is a unit matrix.

By multiplying the transfer function matrix $W_T(z)$ and the transfer function matrix $W_R(z)$ of the linear equalization unit as described above, the input/output relationship of the signal becomes like Equation (11), and demodulation of the data signal S(n) is possible.

[Math. 12]

$$\hat{S}(n) = W_R(z)H(z)W_T(z)S(n) = S(n) \quad (11)$$

In this manner, the wireless communication system 100 according to the present embodiment can reduce the computation amount by sharing the function of the IAI/ISI equalization by the time domain linear equalization unit with the transmission end linear equalization unit 202 and the reception end linear equalization unit 302. Because an IIR type transfer function is not used on the transmission end, the tap truncation error of the IAI can be suppressed.

Example of 2×2 MIMO

Next, a description will be given of a case of 2×2 MIMO as a specific example.

Figure 2:
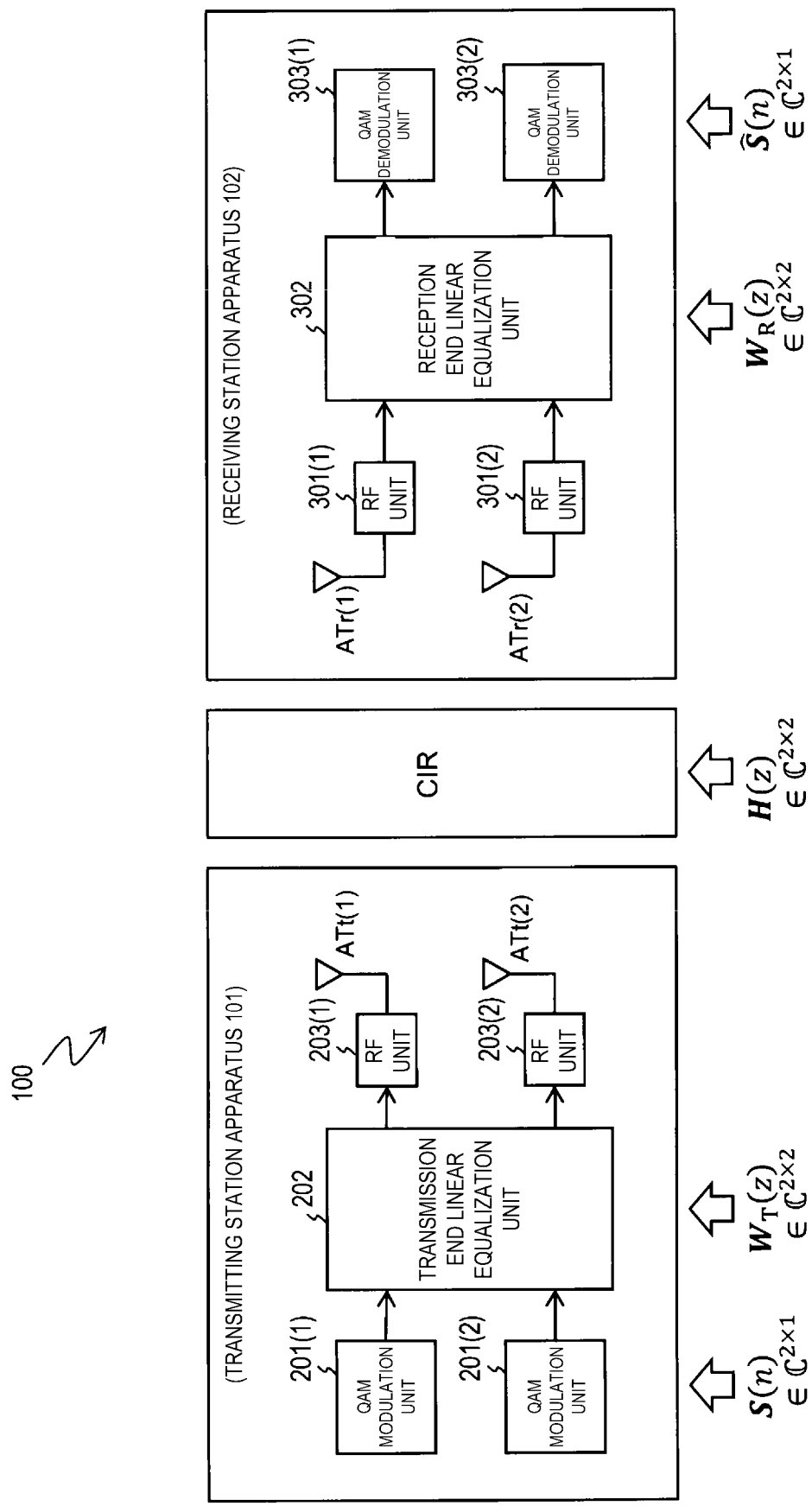
FIG. 2 is a diagram illustrating an example of 2×2 MIMO.

FIG. 2 illustrates an example of 2×2 MIMO. Note that in FIG. 2, blocks having the reference signs identical to those in FIG. 1 operate similarly to the blocks of FIG. 1. Here, FIG. 2 illustrates a case of $N_T=2$ and $N_R=2$ in the wireless communication system 100 illustrated in FIG. 1, and the transmitting station apparatus 101 includes two antennas of the antenna ATt (1) and the antenna ATt (2), and the receiving station apparatus 102 includes two antennas of the antenna ATr (1) and the antenna ATr (2). Note that the number of streams K is 2.

In FIG. 2, the communication path response CIR can represent H(z) as in Equation (12), with $N_T=2$ and $N_R=2$ in H(z) of Equation (2).

[Math. 13]

$$H(z) = \begin{bmatrix} H_{11}(z) & H_{12}(z) \\ H_{21}(z) & H_{22}(z) \end{bmatrix} \quad (12)$$

In the example of FIG. 2, IAI occurs due to spatial extension between the two antennas of the transmitting station apparatus 101 and the two antennas of the receiving station apparatus 102, but in the transfer function matrix $W_T(z)$ of the transmission end linear equalization unit 202 of Equation (9), the transfer function matrix $W_T(z)$ can be expressed as Equation (13), with $N_T=2$ and K=2.

[Math. 14]

$$W_T(z) = \begin{bmatrix} H_{22}(z) & -H_{12}(z) \\ -H_{21}(z) & H_{11}(z) \end{bmatrix} \quad (13)$$

Here, $W_T(z)$ is constituted by an FIR type equalization unit.

The reception signal Y(n) received by the receiving station apparatus 102 can be expressed as Equation (14).

[Math. 15]

$$Y(n) = \quad (14)$$
$$W_T(z)H(z)S(n) = \begin{bmatrix} H_{22}(z) & -H_{12}(z) \\ -H_{21}(z) & H_{11}(z) \end{bmatrix} \begin{bmatrix} H_{11}(z) & H_{12}(z) \\ H_{21}(z) & H_{22}(z) \end{bmatrix} S(n) =$$
$$\begin{bmatrix} H_{22}(z)H_{11}(z) - H_{12}(z)H_{21}(z) & 0 \\ 0 & H_{22}(z)H_{11}(z) - H_{12}(z)H_{21}(z) \end{bmatrix} S(n)$$

Meanwhile, in the receiving station apparatus 102, the transfer function matrix $W_R(z)$ of the reception end linear equalization unit 302 can be represented by Equation (15). Note than I is a unit matrix.

[Math. 16]

$$W_R(z) = \frac{1}{H_{11}(z)H_{22}(z) - H_{12}(z)H_{21}(z)} I = \quad (15)$$
$$\begin{bmatrix} \frac{1}{H_{11}(z)H_{22}(z) - H_{12}(z)H_{21}(z)} & 0 \\ 0 & \frac{1}{H_{11}(z)H_{22}(z) - H_{12}(z)H_{21}(z)} \end{bmatrix}$$

Here, $W_R(z)$ is constituted by an IIR type equalization unit, but can be constituted as an FIR type equalization unit by performing approximation using an infinite series. As shown in Equation (15), the diagonal components of the diagonalized transfer function matrix $W_R(z)$ on the receiving station apparatus 102 end are the same and are used in common for each stream, and thus the polynomial multiplication may only be performed once.

Then, the reception end linear equalization unit 302 can equalize the ISI included in the reception signal Y(n) as shown in Equation (16) by multiplying the reception signal Y(n) of Equation (14) by the transfer function matrix $W_R(z)$ of Equation (15), and demodulate the data signal S(n).

[Math. 17]

$$\hat{S}(n) = W_R Y(n) = \frac{1}{H_{11}(z)H_{22}(z) - H_{12}(z)H_{21}(z)} \quad (16)$$

$$IY(n) = \begin{bmatrix} \frac{1}{H_{11}(z)H_{22}(z) - H_{12}(z)H_{21}(z)} & 0 \\ 0 & \frac{1}{H_{11}(z)H_{22}(z) - H_{12}(z)H_{21}(z)} \end{bmatrix}$$

$$Y(n) = S(n)$$

Comparison of Computation Amount with Related Art

Next, the computation amount of the transmission end linear equalization unit 202 and the reception end linear equalization unit 302 according to the present embodiment is compared with the computation amount of the equalization unit of the related art.

In NPL 1 described in the related art, the following equation indicates a transfer function matrix W(z) used in an equalization unit on the transmission end.

[Math. 18]

$$W(z) = \frac{1}{H_{11}(z)H_{22}(z) - H_{12}(z)H_{21}(z)} \begin{bmatrix} H_{22}(z) & -H_{12}(z) \\ -H_{21}(z) & H_{11}(z) \end{bmatrix} \quad (17)$$

In the case of the above equation, because of 2×2 MIMO, the polynomial multiplication will be performed four (2*2=4) times. In a case of $N_T \times N_R$ MIMO, polynomial multiplication must be performed $N_T * N_R$ times.

In contrast, in the present embodiment, the transmission end linear equalization unit 202 of the transmitting station apparatus 101 only multiplies the transfer function matrix $W_T(z)$ of Equation (13) by the data signal S(n), so there is no need to multiply the polynomial. The reception end linear equalization unit 302 of the receiving station apparatus 102 multiplies the transfer function matrix $W_R(z)$ of Equation (15) by the reception signal Y(n), but the transfer function on the reception end uses a common one for each stream, so the polynomial multiplication may be performed only once.

In this way, the wireless communication system 100 according to the present embodiment can significantly reduce the computation amount because the number of times of polynomial multiplication is small compared to the related art.

Comparison of Residual Components of Equalization Unit

Next, the residual components of the transmission end linear equalization unit 202 and the reception end linear equalization unit 302 according to the present embodiment are compared with the residual components of the equalization unit of the related art.

Equation (18) indicates the residual components of the equalization unit in NPL 1 described in the related art. Note that $\Delta_{ij}$ is a residual component of IAI/ISI.

[Math. 19]

$$H(z)W(z) = \begin{bmatrix} 1 + \Delta_{11} & \Delta_{12} \\ \Delta_{21} & 1 + \Delta_{22} \end{bmatrix} \quad (18)$$

As shown in Equation (18), IAI components $\Delta_{12}$ and $\Delta_{21}$ remain between the antennas of the antennas ATt (1) and ATr (2) and the antennas ATt (2) and ATr (1), and ISI components $\Delta_{11}$ and $\Delta_{22}$ remain between the antennas of the antennas ATt (1) and ATr (1) and the antennas ATt (2) and ATr (2).

In contrast, in the present embodiment, the residual components of the transmission end linear equalization unit 202 and the reception end linear equalization unit 302 can be represented as in Equation (19). Note that $\Delta\tilde{}_{ij}$ is the residual component of the ISI.

[Math. 20]

$$W_R(z)H(z)W_T(z) = \begin{bmatrix} 1 + \tilde{\Delta}_{11} & 0 \\ 0 & 1 + \tilde{\Delta}_{22} \end{bmatrix} \quad (19)$$

As shown in Equation (19), the residual component of the IAI between the antennas of the antennas ATt (1) and ATr (2) and the antennas ATt (2) and ATr (1) is 0. Then, only the ISI components $\Delta\tilde{}_{11}$ and $\Delta\tilde{}_{22}$ remain between the antennas of the antennas ATt (1) and ATr (1) and antennas ATt (2) and ATr (2).

In this way, the wireless communication system 100 according to the present embodiment does not use an IIR type transfer function on the transmission end as compared to the related art, and thus, the tap truncation error of the transfer function for the IAI equalization can be suppressed.

First Embodiment

Figure 3:
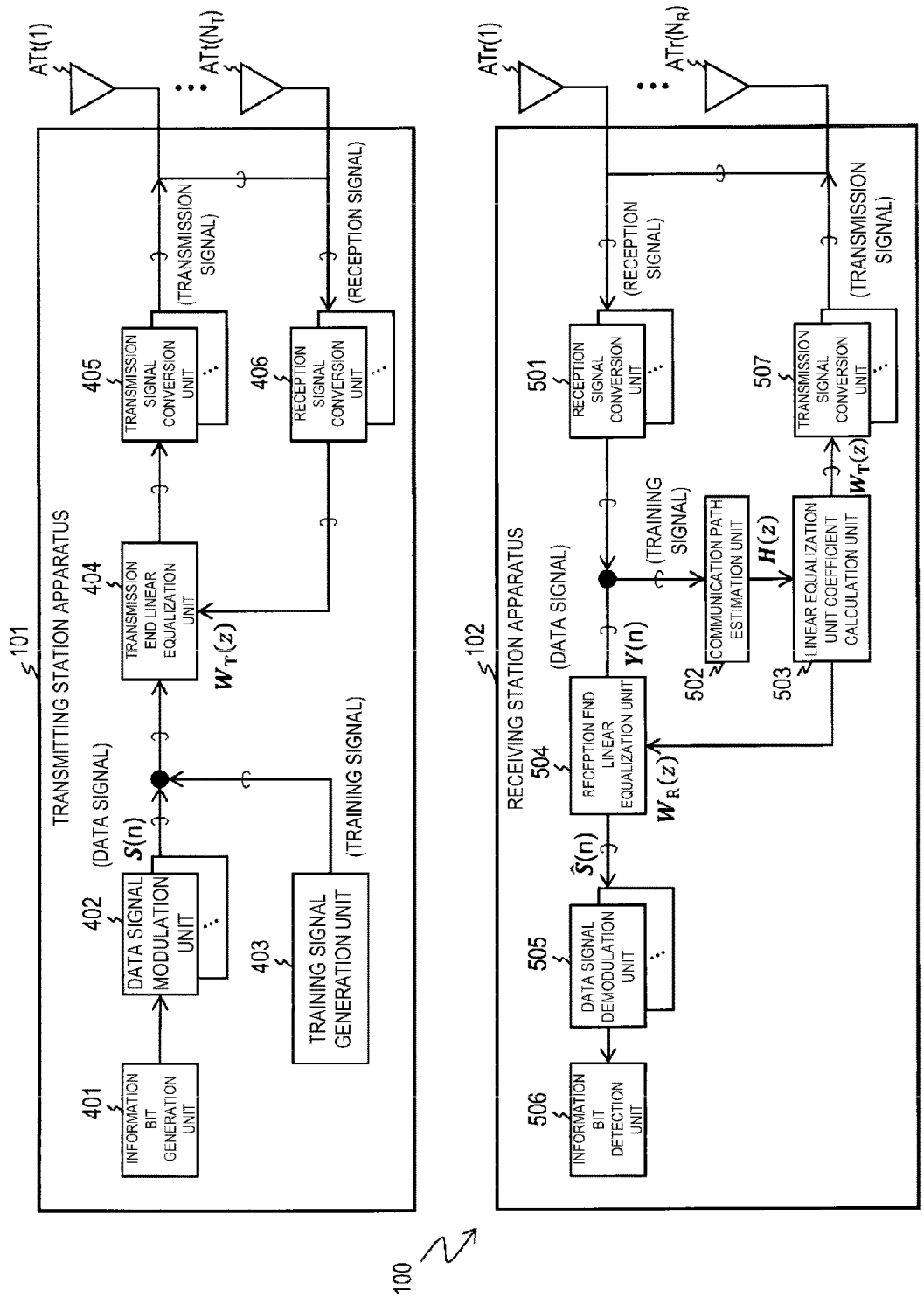
FIG. 3 is a diagram illustrating an example of a transmitting station apparatus and a receiving station apparatus according to the first embodiment.

FIG. 3 illustrates an example of the transmitting station apparatus 101 and the receiving station apparatus 102 according to the first embodiment. Note that FIG. 3 illustrates detailed configuration examples of the transmitting station apparatus 101 and the receiving station apparatus 102 illustrated in FIGS. 1 and 2.

In FIG. 3, the transmitting station apparatus 101 includes an information bit generation unit 401, data signal modulation units 402, a training signal generation unit 403, a transmission end linear equalization unit 404, transmission signal conversion units 405, reception signal conversion units 406, and the $N_T$ antennas of the antenna ATt (1) to the antenna ATt ($N_T$). In FIG. 3, the receiving station apparatus 102 includes the $N_R$ antennas of the antenna ATr (1) to the antenna ATr ($N_R$), reception signal conversion units 501, a communication path estimation unit 502, a linear equalization unit coefficient calculation unit 503, a reception end linear equalization unit 504, data signal demodulation units 505, an information bit detection unit 506, and transmission signal conversion units 507.

First, a configuration of the transmitting station apparatus 101 will be described.

The information bit generation unit 401 generates data information bits to be transmitted to the receiving station apparatus 102. The data information bits are a bit sequence corresponding to, for example, a data signal input from an outside (not illustrated), an internally generated data signal, or the like. Note that the information bit generation unit 401 may have an error correcting coding function of generating an error correcting code at a predetermined coding rate, an interleave function, and the like.

The data signal modulation unit 402 outputs a data signal S(n) obtained by modulating the bit sequence output by the information bit generation unit 401 in a predetermined modulation scheme (for example, quadrature amplitude modulation (QAM)). Note that in the present embodiment, the bit sequence output by the information bit generation unit 401 is divided for a plurality of streams according to the number of antennas ATt, and the data signal S(n) obtained by modulating for each stream is output. Thus, the data signal modulation unit 402 is provided for each stream.

The training signal generation unit 403 generates a training signal for estimating a communication path response (CIR) (corresponding to the generating step by the transmitting station apparatus). The training signal is a predetermined signal obtained by modulating predetermined information such as a preamble for signal detection (for example, a specific pattern such as an alternating pattern of "01") in a modulation scheme that is less susceptible to interference, such as phase shift keying (PSK). The training signal is used to estimate a CIR in the receiving station apparatus 102. Note that information on the training signal transmitted by the transmitting station apparatus 101 has been already known to the receiving station apparatus 102.

The transmission end linear equalization unit 404 outputs a signal (corresponding to a second data signal) obtained by equalizing the IAI from the data signal S(n) (corresponding to a first data signal) output by the data signal modulation unit 402 to the transmission signal conversion unit 405 (corresponding to the outputting step by the transmitting station apparatus). The transmission end linear equalization unit 404 can be implemented by an equalization unit of a FIR type that has a delay tap holding the data signal output by the data signal modulation unit 402, for example, and shifting the data signal every fixed time, and outputs a sum of signals obtained by multiplying respective delay tap signals by predetermined tap coefficients. Here, the tap coefficients are coefficients constituting the transfer functions for the IAI equalization calculated on the basis of the CIR estimated by the receiving station apparatus 102, and achieves the equalization unit of $W_T(z)$ described in Equation (9) and Equation (13). The transmission end linear equalization unit 404 performs the linear equalization processing for the equalization of the IAI. The processing for normalizing the transmission power is also performed simultaneously with the linear equalization processing. Note that the transmission end linear equalization unit 404 outputs the training signal output by the training signal generation unit 403 as it is without performing a linear equalization processing.

The transmission signal conversion unit 405 frequency-converts the data signal or the training signal output by the transmission end linear equalization unit 404 into a high-frequency transmission signal to be transmitted from the antenna ATt. For example, the transmission signal conversion unit 405 up-converts a data signal or a training signal in the 20 MHz band into a high-frequency signal in the 5 GHz band, and transmits the signal from the antenna ATt. Here, streams divided into the plurality of streams are converted into high-frequency signals, and are transmitted from respective antennas of the antenna ATt (1) to the antenna ATt ($N_T$).

The reception signal conversion unit 406 frequency-converts high-frequency reception signals received by the respective antennas of the antenna ATt (1) to the antenna ATt ($N_T$) into low-frequency baseband signals. For example, the reception signal conversion unit 406 down-converts a high-frequency signal in the 5 GHz band and outputs a baseband signal in the 20 MHz band. In the present embodiment, the reception signal conversion unit 406 receives a control signal including information such as a tap coefficient constituting the transfer function used by the transmission end linear equalization unit 202 from the receiving station apparatus 102, converts the reception signal into a baseband signal, and outputs the baseband signal to the transmission end linear equalization unit 404. Note that a function of a demodulation unit that demodulates the information such as a tap coefficient from the baseband signal may be performed by the transmission end linear equalization unit 202, or the reception signal conversion unit 406 may demodulate the information such as the tap coefficient, and may output the result to the transmission end linear equalization unit 404. Here, the transmission signal conversion unit 405 and the reception signal conversion unit 406 correspond to a transmitting station communication unit that performs the transmitting step and the receiving step by the transmitting station apparatus.

The antennas ATt include the $N_T$ transmission and reception antennas of the antenna ATt (1) to the antenna ATt ($N_T$) and emit high-frequency signals output by the transmission signal conversion units 405 as electromagnetic waves to the space. Alternatively, the antennas ATt convert electromagnetic waves in the space transmitted from the receiving station apparatus 102 into high-frequency signals, and output the result to the reception signal conversion units 406.

In this manner, the transmitting station apparatus 101 can transmit the data signals obtained by equalizing the IAI by the transmission end linear equalization unit 202, to the receiving station apparatus 102.

Next, a configuration of the receiving station apparatus 102 illustrated in FIG. 3 will be described.

The antennas ATr include the $N_R$ transmission and reception antennas of the antenna ATr (1) to the antenna ATr ($N_R$) and emit high-frequency signals output by the transmission signal conversion unit 507 described below as electromagnetic waves to the space. Alternatively, the antennas ATr convert electromagnetic waves in the space transmitted from the transmitting station apparatus 101 into high-frequency signals, and output the result to the reception signal conversion units 501 described below.

Similarly to the reception signal conversion unit 406 of the transmitting station apparatus 101, the reception signal conversion unit 501 frequency-converts high-frequency signals received from each of the antenna ATr (1) to the antenna ATr ($N_R$) into baseband signals. Here, the training signal received from the transmitting station apparatus 101 is output to the communication path estimation unit 502, and the data signals received from the transmitting station apparatus 101 are output to the reception end linear equalization unit 504.

The communication path estimation unit 502 estimates the CIR on the basis of the training signal transmitted from the transmitting station apparatus 101 (corresponding to the estimating step by the receiving station apparatus).

The linear equalization unit coefficient calculation unit 503 calculates, on the basis of the CIR estimated by the communication path estimation unit 502, each of a tap coefficient that constitutes the transfer function (corresponding to the transmission end transfer function) for the IAI equalization used by the transmission end linear equalization unit 404 of the transmitting station apparatus 101 and a tap coefficient that constitutes the transfer function (corresponding to the reception end transfer function) for the ISI equalization used by the reception end linear equalization unit 504 of the receiving station apparatus 102. Then, the information such as the tap coefficient constituting the transfer function for the IAI equalization calculated by the linear equalization unit coefficient calculation unit 503 is transmitted to the transmitting station apparatus 101 end. Note that the linear equalization unit coefficient calculation unit 503 corresponds to the reception end coefficient calculation unit that performs the calculating step by the receiving station apparatus.

The reception end linear equalization unit 504 uses the transfer function for the ISI equalization calculated by the linear equalization unit coefficient calculation unit 503 to output the data signal S^(n) (corresponding to a third data signal) obtained by equalizing the ISI from the signal output by each of the reception signal conversion units 501 to the corresponding data signal demodulation unit 505 (corresponding to the outputting step by the receiving station apparatus).

The data signal demodulation unit 505 demodulates the data signal S^(n) obtained by equalizing the ISI output by the reception end linear equalization unit 504 to information bits, and outputs a bit sequence. Note that because the reception end linear equalization unit 504 outputs the data signals S^(n) of the plurality of streams according to the number of antennas ATr, the data signal demodulation units 505 demodulate the data signals S^(n) for respective streams. Then, the data signal demodulation units 505 output, to the information bit detection unit 506, a bit sequence obtained by coupling bit sequences that have been divided for the plurality of streams in the transmitting station apparatus 101 end. Note that the data signal demodulation units 505 may include an error correction decoding function or a de-interleave function according to the functions of the transmitting station apparatus 101.

The information bit detection unit 506 outputs reception data obtained by converting the bit sequence output by the data signal demodulation units 505 into digital data. Note that the error correction decoding function and the de-interleave function may be performed in the information bit detection unit 506.

The transmission signal conversion unit 507 converts the information output by the linear equalization unit coefficient calculation unit 503 into high-frequency signals, and transmits the high-frequency signals from the antennas ATt. For example, in the present embodiment, the information such as the tap coefficient constituting the transfer function matrix $W_T(z)$ for the equalization of the IAI calculated by the linear equalization unit coefficient calculation unit 503 is transmitted from the antennas ATr to the transmitting station apparatus 101 end. Note that the function of the modulation unit that modulates the information such as the tap coefficient to a baseband signal may be included in the transmission signal conversion units 507 or the linear equalization unit coefficient calculation unit 503. Here, the reception signal conversion unit 501 and the transmission signal conversion unit 507 correspond to the receiving station communication unit that performs the receiving step and the transmitting step by the receiving station apparatus.

In this manner, the receiving station apparatus 102 can estimate the CIR from the training signal transmitted by the transmitting station apparatus 101, and calculate the tap coefficient constituting the transfer function for the IAI and ISI equalization from the estimated CIR. Then, the tap coefficient for the ISI equalization is set to the reception end linear equalization unit 504, and the tap coefficient for the IAI equalization is transmitted to the transmitting station apparatus 101 and set to the transmission end linear equalization unit 404. Thus, the equalization processing of the IAI can be performed on the transmitting station apparatus 101 end, and the equalization processing of the ISI can be performed on the receiving station apparatus 102 end.

Processing Method for Wireless Communication System 100

Figure 4:
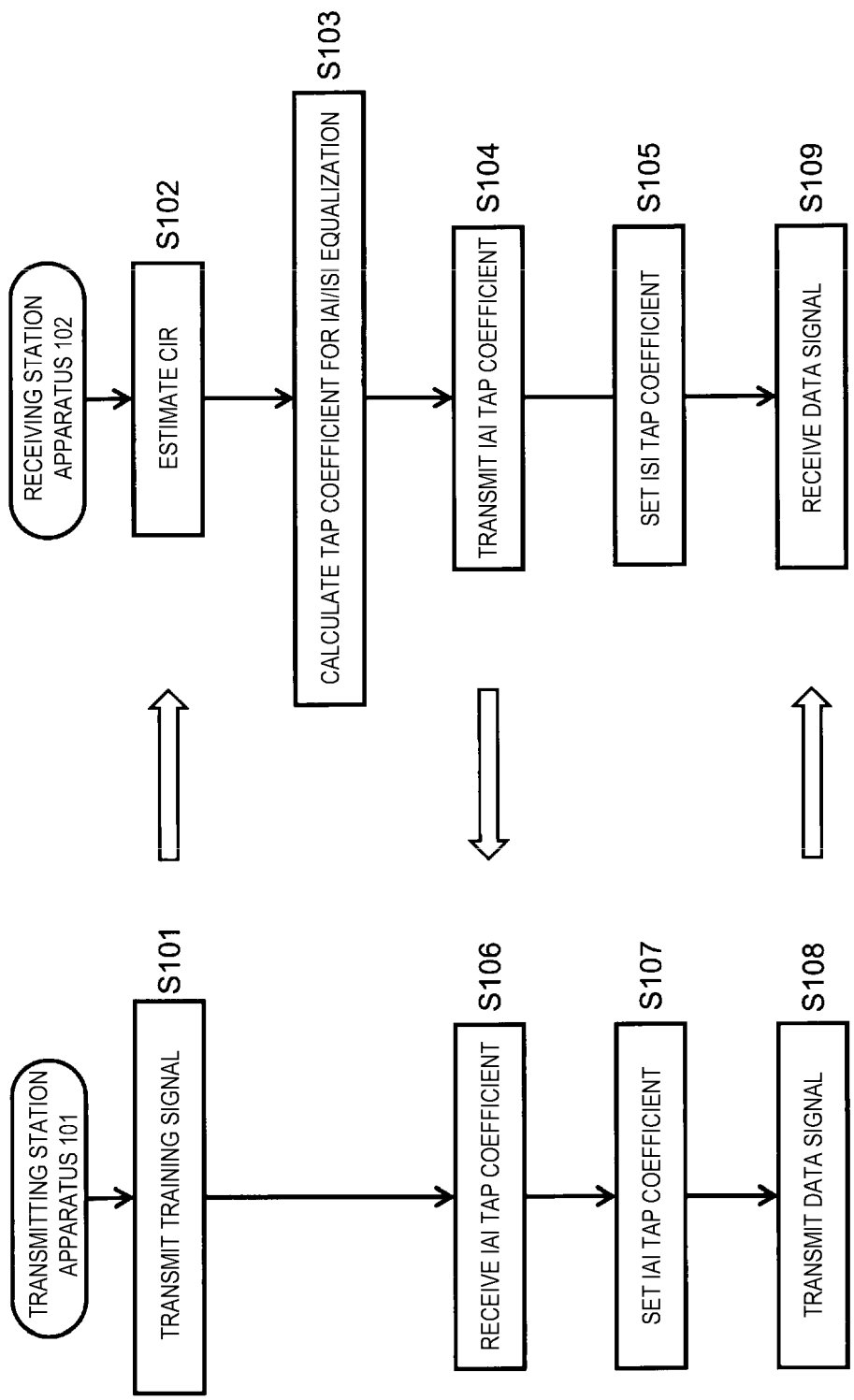
FIG. 4 is a diagram illustrating an example of processing of the wireless communication system according to the first embodiment.

FIG. 4 is a diagram illustrating an example of processing of the wireless communication system 100 according to the first embodiment. Note that the processing illustrated in FIG. 4 is performed by each unit of the transmitting station apparatus 101 and the receiving station apparatus 102 illustrated in FIG. 3.

Step S101: In the transmitting station apparatus 101, the training signal generation unit 403 generates a training signal for estimating the CIR on the receiving station apparatus 102 end, and transmits the training signal from the antenna ATt by the transmission signal conversion unit 405.

Step S102: In the receiving station apparatus 102, the communication path estimation unit 502 receives the training signal transmitted in step S101 and estimates the CIR.

Step S103: In the receiving station apparatus 102, the linear equalization unit coefficient calculation unit 503 calculates, on the basis of the CIR estimated in step S102, a tap coefficient that constitutes the transfer function for the IAI and ISI equalization.

Step S104: In the receiving station apparatus 102, the linear equalization unit coefficient calculation unit 503 transmits the tap coefficient that constitutes the transfer function for the IAI equalization calculated in step S103 to the transmitting station apparatus 101.

Step S105: In the receiving station apparatus 102, the tap coefficient that constitutes the transfer function for the ISI equalization calculated in step S103 is set to the reception end linear equalization unit 504.

Step S106: In the transmitting station apparatus 101, the transmission end linear equalization unit 404 receives, from the receiving station apparatus 102, the tap coefficient that constitutes the transfer function for the IAI equalization calculated in step S103.

Step S107: In the transmitting station apparatus 101, the transmission end linear equalization unit 404 sets the tap coefficient that constitutes the transfer function for the IAI equalization received in step S106.

Step S108: In the transmitting station apparatus 101, the transmission end linear equalization unit 404 starts the transmission of the data signal obtained by equalizing the IAI by using the tap coefficient set in step S107.

Step S109: In the receiving station apparatus 102, the reception end linear equalization unit 504 starts the reception of the data signal obtained by equalizing the ISI from the signal received from the transmitting station apparatus 101, by using the tap coefficient set in step S105.

In this manner, the receiving station apparatus 102 can estimate the CIR from the training signal transmitted by the transmitting station apparatus 101, and calculate the tap coefficient constituting the transfer function for the IAI and ISI equalization from the estimated CIR. The, the tap coefficient constituting the transfer function for the ISI equalization is set to the reception end linear equalization unit 504, and the tap coefficient constituting the transfer function for the IAI equalization is transmitted to the transmitting station apparatus 101 and set to the transmission end linear equalization unit 404. Thus, the equalization processing of the IAI can be performed on the transmitting station apparatus 101 end, and the equalization processing of the ISI can be performed on the receiving station apparatus 102 end.

In particular, in the wireless communication system 100 according to the present embodiment, as described in Equations (18) and (20), the number of times of polynomial multiplication is less than that of the related art, and thus the computation amount can be greatly reduced. Moreover, as described in Equation (24), an IIR type transfer function is not used for the equalization processing of the IAI, so it is possible to suppress the tap truncation error of the IAI.

Second Embodiment

Figure 5:
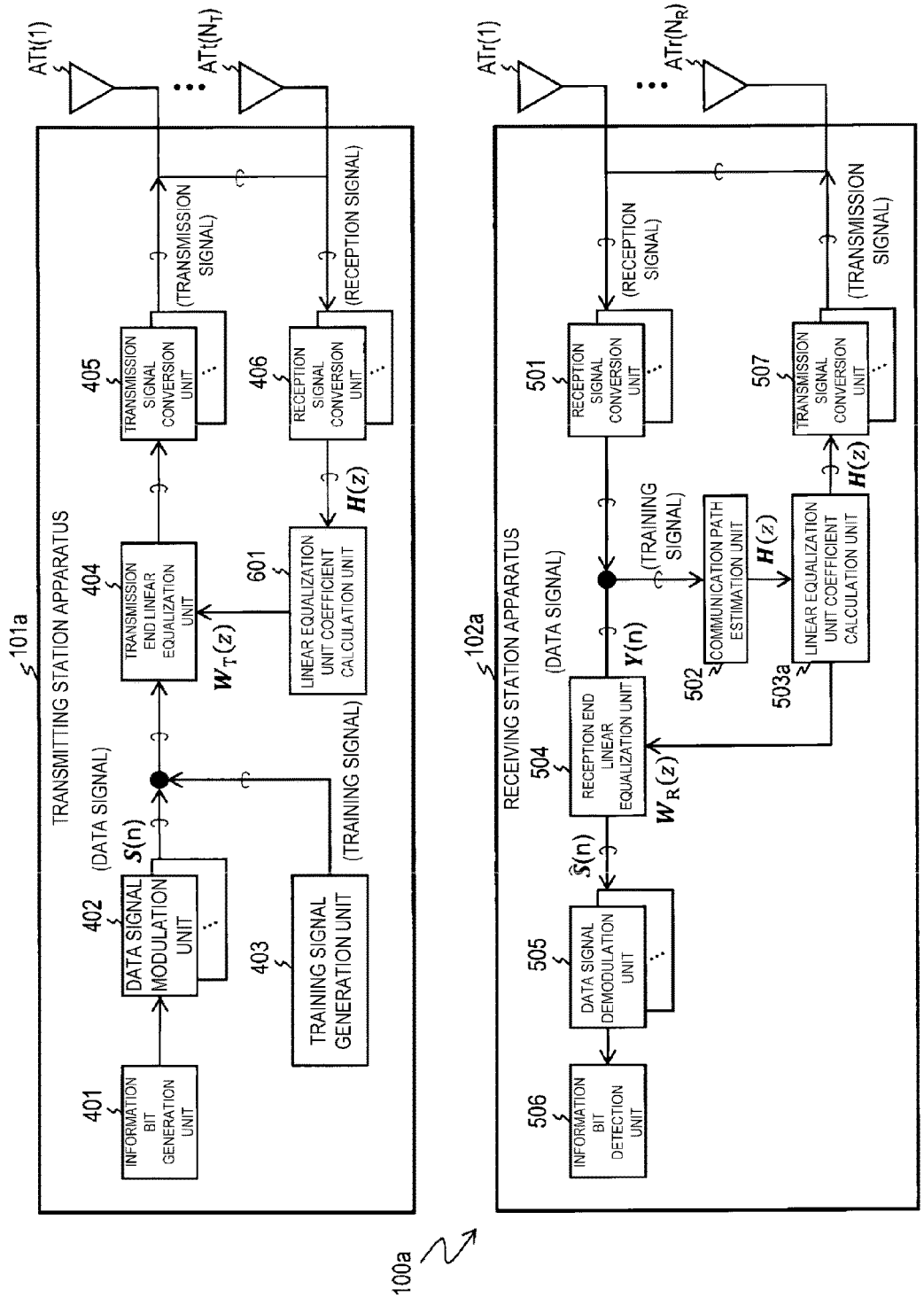
FIG. 5 is a diagram illustrating an example of a transmitting station apparatus and a receiving station apparatus according to the second embodiment.

FIG. 5 illustrates an example of a transmitting station apparatus 101*a* and a receiving station apparatus 102*a* according to a second embodiment. Here, the difference between the wireless communication system 100*a* illustrated in FIG. 5 and the wireless communication system 100 illustrated in FIG. 3 is that the transmitting station apparatus 101*a* includes a linear equalization unit coefficient calculation unit 601. The processing of the linear equalization unit coefficient calculation unit 503*a* of the receiving station apparatus 102*a* is slightly different from the linear equalization unit coefficient calculation unit 503 of the receiving station apparatus 102. Note that in FIG. 5, blocks having the reference signs identical to those in FIG. 3 execute the processing similar to the processing in FIG. 3.

In the receiving station apparatus 102*a*, a linear equalization unit coefficient calculation unit 503*a* calculates, on the basis of the CIR estimated by the communication path estimation unit 502, a tap coefficient that constitutes the transfer function for the ISI equalization in the reception end linear equalization unit 504 of the receiving station apparatus 102. Here, the linear equalization unit coefficient calculation unit 503*a* transmits information on the CIR estimated by the communication path estimation unit 502 to the transmitting station apparatus 101 without performing a calculation on the tap coefficient that constitutes the transfer function for performing the equalization processing to equalize the IAI in the transmission end linear equalization unit 404 of the transmitting station apparatus 101. Note that the information on the CIR may be transmitted directly from the communication path estimation unit 502, from the antennas ATr to the transmitting station apparatus 101 via the transmission signal conversion units 507.

On the other hand, in the transmitting station apparatus 101*a*, the linear equalization unit coefficient calculation unit 601 receives information of the CIR transmitted from the receiving station apparatus 102*a*, calculates the tap coefficient that constitutes the transfer function for the IAI equalization at the transmission end linear equalization unit 404, and sets the tap coefficient to the transmission end linear equalization unit 404. Here, the linear equalization unit coefficient calculation unit 601 corresponds to the transmission end coefficient calculation unit that performs the calculating step by the transmitting station apparatus.

In this manner, similarly to the wireless communication system 100 of the first embodiment, the wireless communication system 100*a* according to the present embodiment can estimate the CIR from the training signal transmitted by the transmitting station apparatus 101*a*, but the information on the CIR is transmitted to the transmitting station apparatus 101*a* end, and the tap coefficient that constitutes the transfer function for the IAI equalization is calculated on the transmitting station apparatus 101*a* end. As a result, the processing for calculating the tap coefficient of the equalization transfer function is distributed to the transmitting station apparatus 101*a* end and the receiving station apparatus 102*a* end, and thus the processing amount of the linear equalization unit coefficient calculation unit 503*a* can be less than the processing amount of the linear equalization unit coefficient calculation unit 503 of the first embodiment. Here, the linear equalization unit coefficient calculation unit 503*a* corresponds to the reception end coefficient calculation unit that performs the calculating step by the receiving station apparatus.

Note that, also in the wireless communication system 100*a* according to the present embodiment, similarly to the wireless communication system 100 of the first embodiment, the number of times of polynomial multiplication is smaller than that of the related art, and thus the computation amount can be reduced. Moreover, an IIR type transfer function is not used for the equalization processing of the IAI, so it is possible to suppress the tap truncation error.

Processing Method for Wireless Communication System 100*a*

Figure 6:
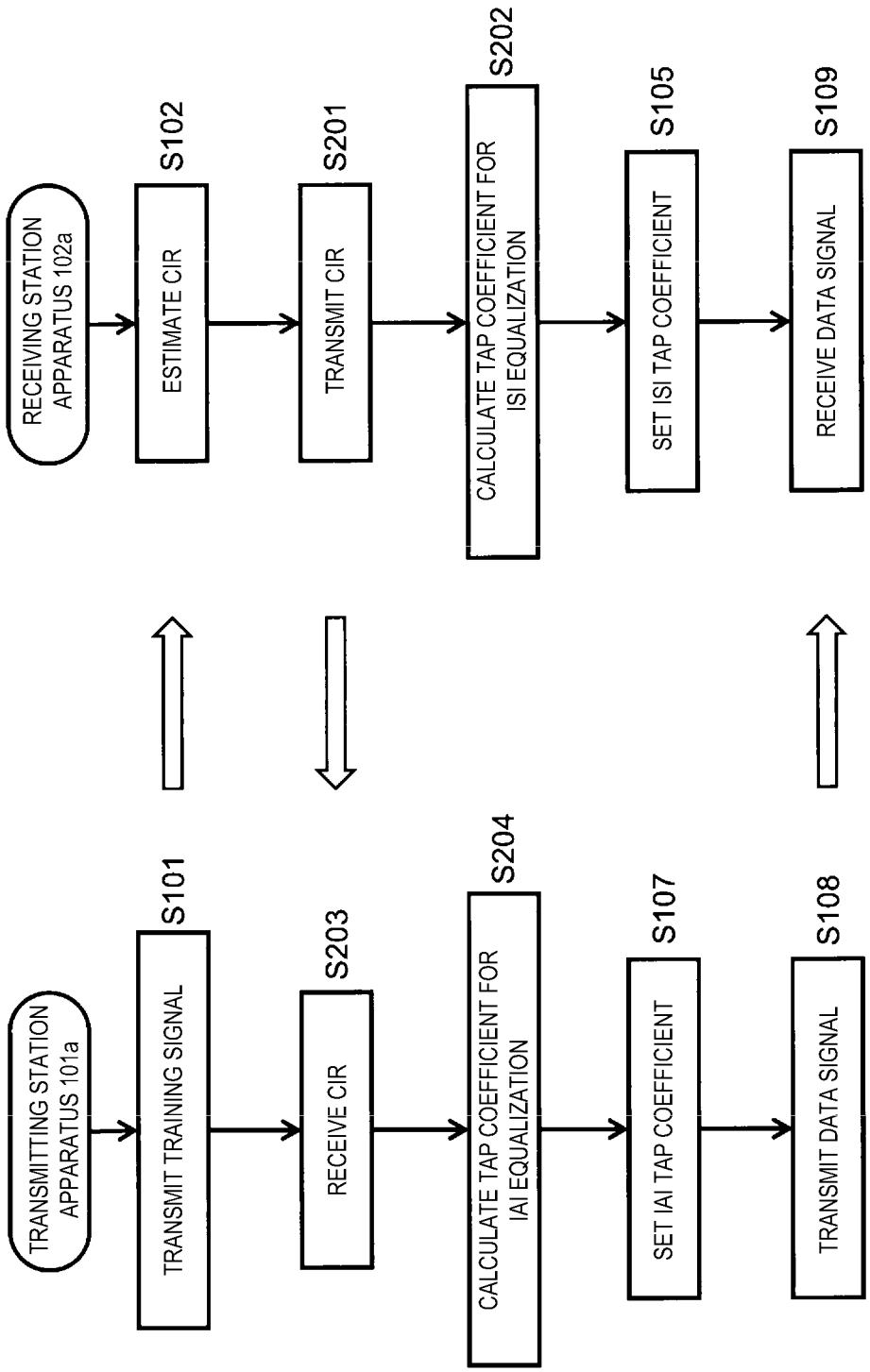
FIG. 6 is a diagram illustrating an example of processing of the wireless communication system according to the second embodiment.

FIG. 6 illustrates an example of processing of the wireless communication system 100*a* according to the second embodiment. Note that the processing illustrated in FIG. 6 is performed by each unit of the transmitting station apparatus 101*a* and the receiving station apparatus 102*a* illustrated in FIG. 5. Note that in FIG. 6, steps having the reference signs identical to those in FIG. 4 described in the first embodiment execute the processing similar to the processing in FIG. 4.

In step S101 and step S102, processing similar to that of FIG. 4 is performed, and the receiving station apparatus 102*a* receives the training signal transmitted from the transmitting station apparatus 101*a* and estimates the CIR.

Step S201: The receiving station apparatus 102*a* transmits the CIR estimated in step S101 to the transmitting station apparatus 101*a*.

Step S202: In the receiving station apparatus 102*a*, the linear equalization unit coefficient calculation unit 503*a* calculates, on the basis of the CIR estimated in step S102, a tap coefficient that constitutes the transfer function for the ISI equalization.

Step S203: The transmitting station apparatus 101*a* receives the CIR transmitted from the receiving station apparatus 102*a* in Step S201.

Step S204: In the transmitting station apparatus 101*a*, the linear equalization unit coefficient calculation unit 601 calculates, on the basis of the CIR received in step S203, a tap coefficient that constitutes a transfer function for the IAI equalization.

In FIG. 6, processing similar to that of FIG. 4 is performed in step S105, and in the receiving station apparatus 102*a*, the tap coefficient that constitutes the transfer function for the ISI equalization calculated in step S202 is set to the reception end linear equalization unit 504.

In FIG. 6, in step S107 and step S108, processing similar to that of FIG. 4 is performed, and in the transmitting station apparatus 101*a*, the tap coefficient that constitutes the transfer function for the IAI equalization calculated in step S204 is set to the transmission end linear equalization unit 404, and the transmission of the data signal obtained by equalizing the IAI is started. In step S109, processing similar to that of FIG. 4 is performed, and in the receiving station apparatus 102*a*, the reception end linear equalization unit 504 starts the reception of the data signal obtained by equalizing the ISI from the signal received from the transmitting station apparatus 101a.

In this manner, similarly to the wireless communication system 100 of the first embodiment, the wireless communication system 100a according to the present embodiment can estimate the CIR from the training signal transmitted by the transmitting station apparatus 101a, but the information on the CIR is transmitted to the transmitting station apparatus 101a end, and the tap coefficient that constitutes the transfer function for the IAI equalization is calculated on the transmitting station apparatus 101a end. As a result, the processing for calculating the tap coefficient of the equalization transfer function is distributed to the transmitting station apparatus 101a end and the receiving station apparatus 102a end, and thus the processing amount of the linear equalization unit coefficient calculation unit 503a can be less than the processing amount of the linear equalization unit coefficient calculation unit 503 of the first embodiment.

As described in each of the embodiments described above, the wireless communication system, the wireless communication method, the transmitting station apparatus, and the receiving station apparatus according to the present invention can reduce the computation amount of the equalization unit that equalizes the IAI and ISI in the SC-MIMO transmission, and suppress the residual errors due to tap truncation.

REFERENCE SIGNS LIST 100, 100a Wireless communication system
101, 101a Transmitting station apparatus
102, 102a Receiving station apparatus
201 QAM modulation unit
202, 404 Transmission end linear equalization unit
203 RF unit
301 RF unit
302, 504 Reception end linear equalization unit
303 QAM demodulation unit
401 Information bit generation unit
402 Data signal modulation unit
403 Training signal generation unit
405, 507 Transmission signal conversion unit
406, 501 Reception signal conversion unit
ATt, ATr Antenna
502 Communication path estimation unit
503, 503a Linear equalization unit coefficient calculation unit
505 Data signal demodulation unit
506 Information bit detection unit
601 Linear equalization unit coefficient calculation unit

The invention claimed is:

1. A wireless communication system configured to perform single carrier multiple-input multiple-output (SC-MIMO) transmission between a transmitting station apparatus and a receiving station apparatus, wherein
the transmitting station apparatus includes
a training signal generation unit configured to generate a training signal that is known,
a transmission end linear equalization unit configured to output a plurality of second data signals obtained by equalizing inter-antenna interference of a plurality of first data signals by utilizing a transmission end transfer function for equalizing the inter-antenna interference, and
a transmitting station communication unit including a plurality of antennas configured to transmit the training signal or the plurality of second data signals to the receiving station apparatus and receive information on the transmission end transfer function from the receiving station apparatus, and
the receiving station apparatus includes
a receiving station communication unit including a plurality of antennas configured to receive the plurality of second data signals or the training signal transmitted by the transmitting station apparatus and transmit the information on the transmission end transfer function to the transmitting station apparatus,
a communication path estimation unit configured to estimate a communication path response from the training signal received by the receiving station communication unit,
a reception end coefficient calculation unit configured to calculate the transmission end transfer function for equalizing inter-antenna interference and a reception end transfer function for equalizing inter-symbol interference, based on the communication path response, and
a reception end linear equalization unit configured to output a plurality of third data signals obtained by equalizing the inter-symbol interference from the plurality of second data signals received by the receiving station communication unit by utilizing the reception end transfer function.

2. The wireless communication system according to claim 1,
wherein the reception end coefficient calculation unit calculates only the reception end transfer function utilized by the reception end linear equalization unit, and transmits information on the communication path response to the transmitting station apparatus, and
the transmitting station apparatus further includes a transmission end coefficient calculation unit configured to calculate, based on the information on the communication path response received from the receiving station apparatus, the transmission end transfer function for equalizing inter-antenna interference.

3. A wireless communication method for performing single carrier multiple-input multiple-output (SC-MIMO) transmission between a transmitting station apparatus and a receiving station apparatus, the wireless communication method comprising the steps of:
by the transmitting station apparatus, generating a training signal that is known;
by the transmitting station apparatus, outputting a plurality of second data signals obtained by equalizing inter-antenna interference of a plurality of first data signals by utilizing a transmission end transfer function for equalizing the inter-antenna interference;
by the transmitting station apparatus, transmitting the training signal or the plurality of second data signals to the receiving station apparatus and receiving information on the transmission end transfer function from the receiving station apparatus;
by the receiving station apparatus, receiving the plurality of second data signals or the training signal transmitted by the transmitting station apparatus and transmitting the information on the transmission end transfer function to the transmitting station apparatus;
by the receiving station apparatus, estimating a communication path response from the training signal received from the transmitting station apparatus;

by the receiving station apparatus, calculating the transmission end transfer function for equalizing inter-antenna interference and a reception end transfer function for equalizing inter-symbol interference, based on the communication path response; and by the receiving station apparatus, outputting a plurality of third data signals obtained by equalizing the inter-symbol interference from the plurality of second data signals that are received by utilizing the reception end transfer function.

4. The wireless communication method according to claim 3,
wherein the calculating step by the receiving station apparatus calculates only the reception end transfer function utilized by the outputting step by the receiving station apparatus, and transmits information on the communication path response to the transmitting station apparatus, and the transmitting station apparatus further performs calculating, based on the information on the communication path response received from the receiving station apparatus, the transmission end transfer function for equalizing inter-antenna interference.

5. A transmitting station apparatus configured to perform single carrier multiple-input multiple-output (SC-MIMO) transmission with a receiving station apparatus, the transmitting station apparatus comprising:

a training signal generation unit configured to generate a training signal that is known;

a transmission end linear equalization unit configured to output a plurality of second data signals obtained by equalizing inter-antenna interference of a plurality of first data signals by utilizing a transmission end transfer function for equalizing the inter-antenna interference; and a transmitting station communication unit including a plurality of antennas configured to transmit the training signal or the plurality of second data signals to the receiving station apparatus and receive information on the transmission end transfer function from the receiving station apparatus.

6. The transmitting station apparatus according to claim 5,
wherein the transmitting station apparatus further includes a transmission end coefficient calculation unit configured to calculate, based on information on a communication path response received from the receiving station apparatus, the transmission end transfer function for equalizing inter-antenna interference.

* * * * *